United States Patent
Leckliter et al.

(10) Patent No.: US 9,511,742 B2
(45) Date of Patent: Dec. 6, 2016

(54) SEAT BELT PRETENSIONER LOCKING DEVICE

(71) Applicant: TK HOLDINGS INC., Auburn Hills, MI (US)

(72) Inventors: Garrett James Leckliter, Rochester Hills, MI (US); Robert Frank Rogers, Lake Orion, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/702,202

(22) Filed: May 1, 2015

(65) Prior Publication Data

US 2016/0318473 A1 Nov. 3, 2016

(51) Int. Cl.
*B60R 22/19* (2006.01)
*B60R 22/195* (2006.01)
*B60R 22/18* (2006.01)

(52) U.S. Cl.
CPC ............ *B60R 22/195* (2013.01); *B60R 22/18* (2013.01); *B60R 22/1952* (2013.01); *B60R 2022/1806* (2013.01)

(58) Field of Classification Search
CPC .... B60R 22/195; B60R 22/1952; B60R 22/18; B60R 2022/1806
See application file for complete search history.

(56) References Cited

U.S. PATENT DOCUMENTS

| | | | |
|---|---|---|---|
| 4,840,325 A * | 6/1989 | Higuchi | B60R 22/1951 242/374 |
| 5,533,756 A * | 7/1996 | Dybro | B60R 22/195 280/806 |
| 5,667,246 A * | 9/1997 | Miller, III | B60R 22/195 280/735 |
| 6,068,664 A * | 5/2000 | Meyer | B60R 22/28 280/806 |
| 6,866,296 B2 * | 3/2005 | Webber | B60R 22/1952 280/806 |
| 7,490,857 B2 * | 2/2009 | Tomita | B60R 22/1952 280/806 |
| 9,126,555 B2 * | 9/2015 | Ver Hoven | B60R 22/1954 |
| 2004/0256850 A1 * | 12/2004 | Yamaguchi | B60R 22/195 280/806 |
| 2012/0299282 A1 * | 11/2012 | Holbein | B60R 22/03 280/806 |
| 2015/0307060 A1 * | 10/2015 | Arnold | B60R 22/03 297/469 |

* cited by examiner

*Primary Examiner* — Drew Brown
(74) *Attorney, Agent, or Firm* — Gordon & Rees LLP

(57) ABSTRACT

A seat belt pretensioner including a casing defining a pivot axis and having a locking member, a driving mechanism supported by the casing, a flexible connecting member, and a cam. The driving mechanism includes a movable member that moves relative to the casing during pretensioning. The flexible connecting member has a first end coupled to the movable member and a second end that is attachable to one of the anchor, the buckle and the webbing. The cam includes a locking surface having a cross-sectional shape that is an Archimedean spiral. The cam is rotatable about the pivot axis between a non-locking position, in which the connecting member is able to freely move between the cam and the locking member, and a locking position, in which the locking surface clamps the connecting member to the locking member to prevent any further movement of the connecting member relative to the locking member.

19 Claims, 5 Drawing Sheets

SEAT BELT PRETENSIONER LOCKING DEVICE

BACKGROUND

The present application relates generally to the field of occupant restraint systems for use in moving vehicles. More specifically, the present application relates to a locking cam of an occupant restraint system for limiting the travel of a connecting member of a pretensioning device.

SUMMARY

One embodiment relates to a seat belt pretensioner for use with a seat belt assembly having an anchor, a buckle and a webbing. The pretensioner includes a casing defining a pivot axis and including a locking member, a driving mechanism supported by the casing, a flexible connecting member, and a cam. The driving mechanism including a movable member that is configured to move relative to the casing during pretensioning. The flexible connecting member has a first end coupled to the movable member and a second end configured to be coupled to one of the anchor, the buckle and the webbing. The cam includes a locking surface having a cross-sectional shape that is an Archimedean spiral. The cam is rotatable about the pivot axis relative to the casing between a non-locking position, in which the connecting member is able to freely move between the cam and the locking member of the casing, and a locking position, in which the locking surface clamps the connecting member to the locking member to prevent any further movement of the connecting member relative to the locking member.

Another embodiment relates to a seat belt system for pretensioning a seat belt of a vehicle. The pretensioning system includes the seat belt configured to restrain an occupant of the vehicle, an anchor coupled to a first portion of the seat belt, a tongue member adjustably coupled to a second portion of the seat belt, a buckle mechanism configured to selectively receive the tongue member, and a pretensioner assembly. The pretensioner assembly includes a casing including a locking member, a driving mechanism supported by the casing, a flexible connecting member, and a cam. The driving mechanism including a movable member that is movable relative to the casing. The flexible connecting member has a first portion coupled to the movable member and a second portion coupled to one of the anchor and the buckle mechanism. The cam includes a smooth contact surface. The cam is supported by the casing and is rotatable about a pivot axis relative to the casing between a non-locking position, in which the connecting member is able to freely move between the cam and the locking member of the casing, and a locking position, in which the contact surface clamps the connecting member between the cam and the locking member to prevent any further movement of the connecting member relative to the locking member.

Yet another embodiment relates to a method of pretensioning a seat belt of a seat belt system configured to restrain an occupant of a vehicle. The method includes the steps of detecting a pretensioning event of the vehicle, activating a driving mechanism of a seat belt pretensioner to move a movable member relative to a casing to thereby move a connecting member coupled to the movable member in a pretensioning direction to pretension the seat belt coupled to the connecting member, and rotating a cam from a non-locking position to a locking position. In the non-locking position, the connecting member is able to freely move between the cam and a locking member of the casing. In the locking position, a locking contact surface of the cam clamps the connecting member between the cam and the locking member to prevent movement of the connecting member relative to the locking member in a direction opposite the pretensioning direction, after a length of travel of movable member relative to the casing. The cam may include a material having a hardness of 45 to 95 HRB.

It is to be understood that both the foregoing general description and the following detailed description are exemplary and explanatory only, and are not restrictive of the invention as claimed.

BRIEF DESCRIPTION OF THE DRAWINGS

Features, aspects, and advantages of the pretensioning systems of this application will become apparent from the following description, appended claims, and the accompanying exemplary embodiments shown in the drawings, which are briefly described below.

DETAILED DESCRIPTION

Figure 1:
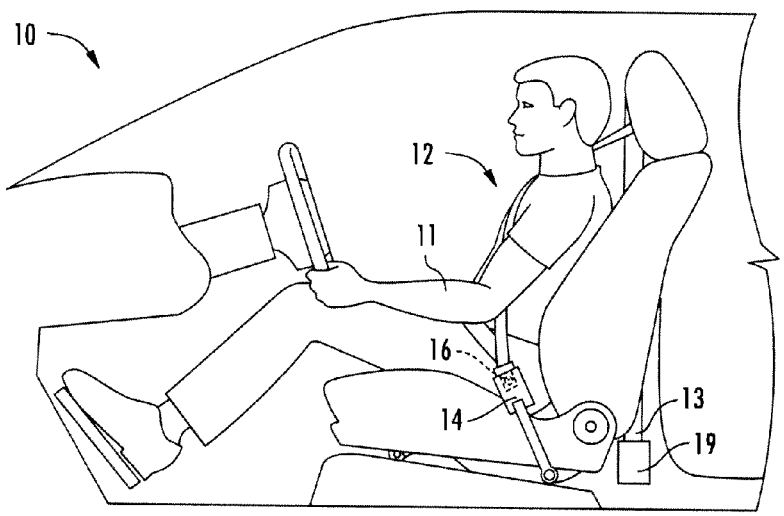
FIG. 1 is a left-side view of a vehicle compartment with an occupant secured to a seat assembly by a seat belt system with a pretensioner.
Figure 2:
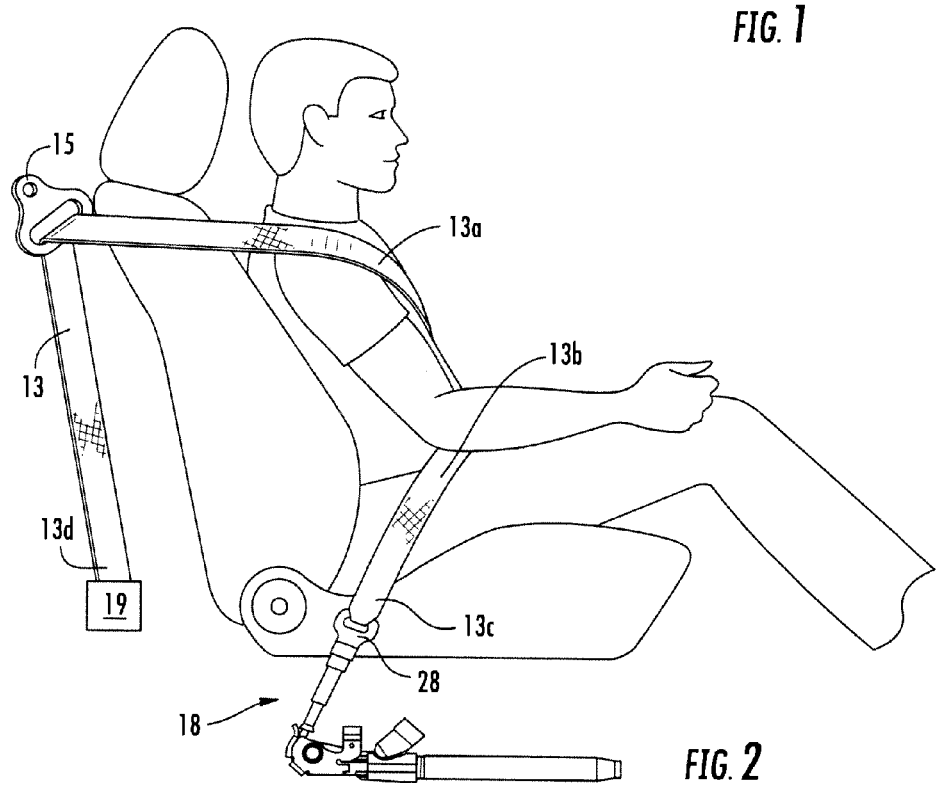
FIG. 2 is a right-side view of the seat belt system of FIG. 1.

FIGS. 1 and 2 illustrate an exemplary embodiment of a vehicle 10 having an interior compartment that is configured to provide seating to an occupant 11. The vehicle 10 includes a seat belt assembly 12 that is configured to secure (e.g., restrain) the occupant 11 when seated in a seat assembly of the vehicle 10.

As shown, the seat belt assembly 12 (e.g., seat belt system, occupant restraint device, etc.) includes a seat belt 13 (e.g., a webbing) having a shoulder portion 13a and a lap portion 13b that are separated by a tongue member 16 that is configured to selectively (e.g., releasably) engage a buckle mechanism 14. The lap portion 13b of the seat belt 13 is configured to generally wrap around the lap of the occupant 11 to restrain the lower portion of the occupant 11 during a dynamic vehicle event. The lap portion 13b may have an end 13c disposed opposite the tongue member 16 that is configured to be fixed, such as, for example, to a coupling member 28 in the form of an anchor (e.g., a mounting member, etc.) of a pretensioning device 18 (e.g., a pretensioner). The shoulder portion 13a of the seat belt 13 is configured to generally wrap around the torso and shoulder of the occupant to restrain the torso or thorax of the occupant during a dynamic vehicle event. The shoulder portion 13a may have an end 13d disposed opposite the tongue member 16 that is configured to be secured, such as, for example, retractably secured to a retractor 19 where the seat belt 13 is configured to wind (e.g., retract) and unwind (e.g., extract) about the refractor 19. The retractor 19 may be integrated with the seat or attached to the vehicle 10. The seat belt assembly 12 may also include a D-ring 15 (e.g., a shoulder anchor, etc.), such as when the retractor 19 is attached to the vehicle, to guide the shoulder portion 13a of the seat belt 13. It is noted that the seat belt assembly 12 may have any suitable configuration and may include fewer or additional components to restrain a secured occupant in a vehicle, and the example disclosed herein is not limiting.

The pretensioner 18 is configured to pretension the seat belt 13, such as during a dynamic vehicle event (e.g., a frontal impact), by removing an amount of slack between the seat belt 13 and the occupant 11 that is present at the onset of the vehicle event. For example, the pretensioner 18 may displace the coupling member 28 (e.g., an anchor of the seat belt) in a direction away from the occupant to thereby displace the end 13c of the seat belt 13 that is connected to the coupling member 28 a corresponding distance to remove slack between the occupant 11 and the seat belt 13.

Figure 3:
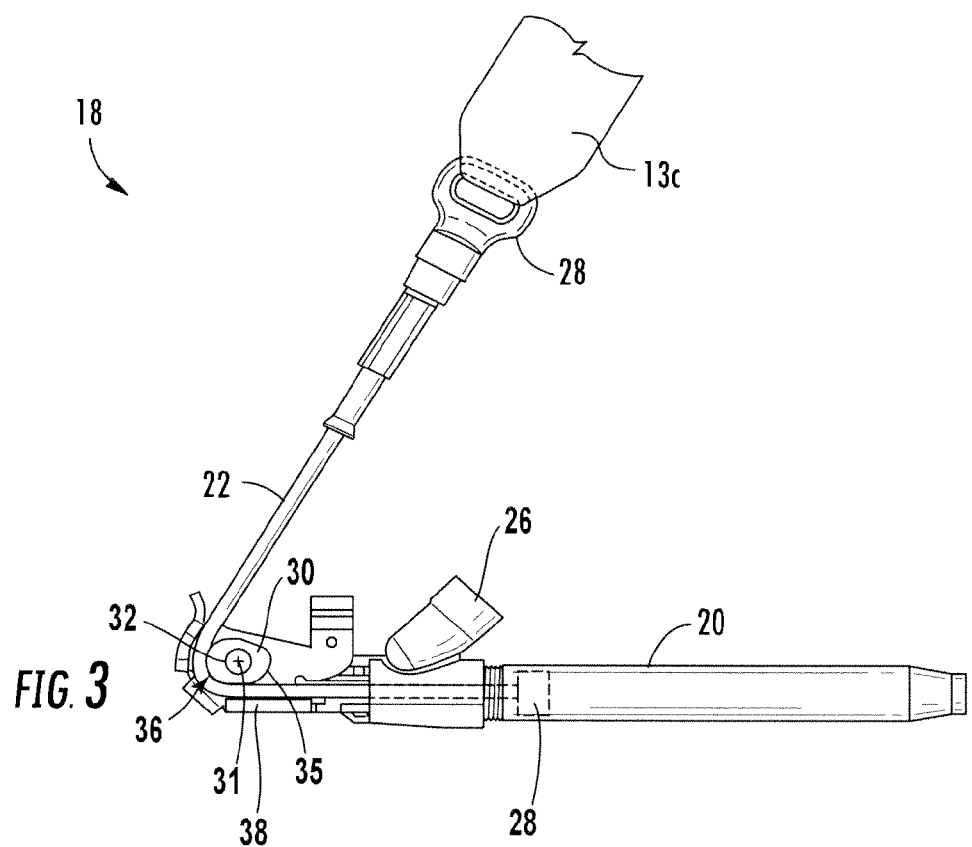
FIG. 3 is a right-side view of a pretensioning device of the seat belt system of FIG. 2.

FIG. 3 illustrates an exemplary embodiment of the pretensioner 18 including a casing 20 that houses a moveable member, shown as a piston 24, that is configured to move (e.g., displace) within a chamber of the casing 20. The pretensioner 18 may also include a flexible connecting member, shown as a cable 22 (e.g., wire), that is coupled to the piston 24, such that movement of the piston 24 moves (e.g., pulls) the cable 22 to thereby move (e.g., displace) the end 13c of the seat belt 13 fixed to the cable 22. The piston 24 is moved in response to a force applied to the piston 24 by a driving mechanism 26. In one exemplary embodiment, the driving mechanism 26 is a pyrotechnic gas generator that generates gas, which acts upon the piston 24 to drive the piston 24 within the casing 20. For example, the gas may be generated in a sealed compartment of the casing that is on the side of the piston 24 to which the cable 22 is attached, such that the pressure from the gas moves the piston 24 within a chamber of the casing 20 to pull the cable 22 (e.g., in a pretensioning direction).

The cable 22 of the pretensioner 18 extends between the coupling member 28 and the piston 24, and between the coupling member 28 and the piston 24, the cable 22 passes over a cam 30. The cam 30 is rotatable relative to the casing 20 about a pivot axis 31. For example, the cam 30 may rotate about a pin 32 that is fixed relative to the casing 20.

The cam 30 of the pretensioner 18 includes at least one surface that is in contact with or is configured to come into contact with the cable 22, such as during pretensioning. For example, the cam 30 may include a locking surface 35 (e.g., a locking contact surface, etc.) that is configured to come into contact with a portion of the connecting member, such as after a set amount of pretensioning of the seat belt (e.g., travel of the connecting member relative to the casing), to lock the connecting member in place to prevent additional movement of the connecting member relative to the casing. Also, for example, the cam 30 may include a guide surface 36 (e.g., a guide contact surface, etc.) that is configured to contact the cable 22 to guide the relative movement between the connecting member and the cam 30. The guide surface 36 may be configured to act as a pulley when the connecting member (e.g., the cable 22) moves relative to the cam 30, such as in a pretensioning direction to allow the cable 22 to move efficiently along the guide surface 36 relative to the cam 30. The guide surface 36 may be configured to induce rotation of the cam 30, such as in a clockwise direction in FIG. 5, when the connecting member moves in a loosening direction to bring the locking surface 35 into contact (or further contact) with, for example, the cable 22. According to an exemplary embodiment, the guide surface 36 of the cam 30 is flat across its thickness (e.g., depth). However, the guide surface 36 may have other configurations, such as being concave.

Figure 4:
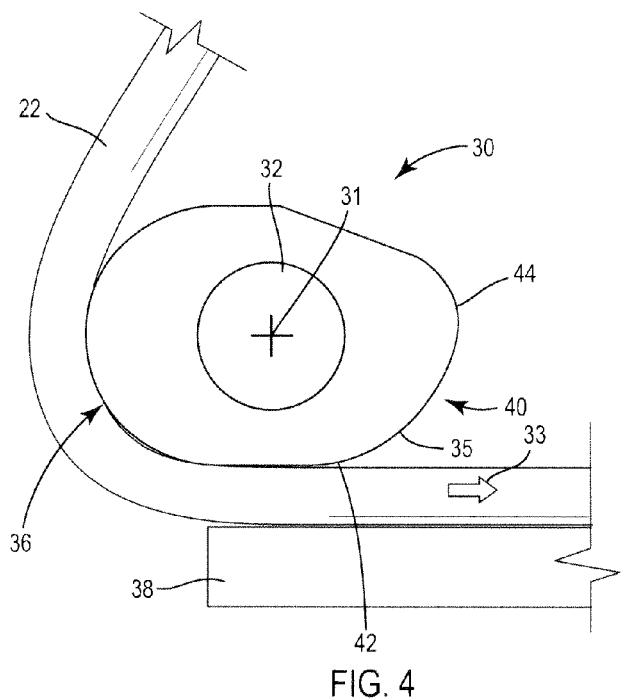
FIG. 4 is a right-side view of a portion of the pretensioning device of FIG. 3, showing a cam in a non-locking position.
Figure 5:
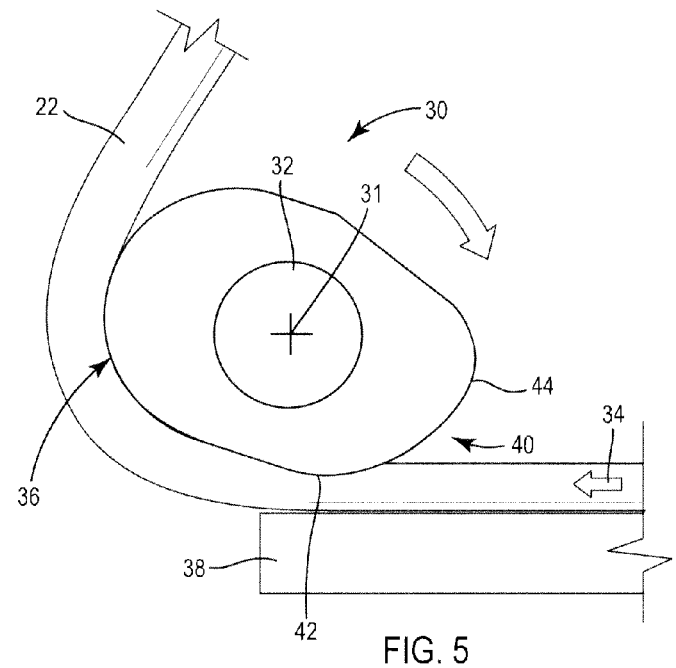
FIG. 5 is a right-side view of a portion of the pretensioning device of FIG. 3, showing the cam in a locking position.

As shown in FIGS. 4 and 5, the cam 30 is rotatable between a non-locking position and a locking position. In the non-locking position (FIG. 4), the cable 22 is able to freely move between the cam 30 and a locking member of the casing 20, shown as a counter plate 38 positioned generally below the cam 30. For example, the cable 22 may be able to freely move in a first direction 33 (e.g., a pretensioning direction) corresponding to a tensioning of the seat belt 13. Accordingly, the cable 22 may be moved by the piston 24 relative to the cam 30 to in-turn move the seat belt 13 to remove slack from between the seat belt 13 and the occupant 11. The cam 30 is configured to pivot about the pivot axis 31 from the non-locking position to the locking position. In the locking position (FIG. 5), the cam 30 is configured to clamp (e.g., pinch, bind, retain, etc.) the cable 22 between the locking surface 35 and the counter plate 38. The clamping force imparted by the cam 30 is configured to prevent further movement of the cable 22 relative to the cam 30 and the counter plate 38, which in-turn prevents any further movement of the seat belt 13 coupled to the cable 22 through the coupling member 28. For example, the cable 22 may be prevented from moving relative to the cam 30 and the counter plate 38 in a second direction 34 (e.g., a loosening direction) that is opposite of the first direction. The second direction 34 corresponds to a releasing of tension on the seat belt 13, such as to increase slack between the seat belt 13 and the occupant 11.

According to an exemplary embodiment, the locking surface 35 is a smooth surface (e.g., a surface free or devoid of teeth, recesses, projections, as well as any other types of sharp edges). At least a portion of the cam 30 is configured with a cross-sectional shape (e.g., profile) that is at least partially an Archimedean spiral. According to an exemplary embodiment, the locking surface 35 of the cam 30 is configured having a cross-sectional shape (e.g., profile) that is an Archimedean spiral. The origin of the Archimedean locking surface 35 may be coincident (e.g., concentric, co-linear, etc.) with the pivot axis 31. Thus, the locking surface 35 of the cam 30 may be configured having an increasing radius moving along the surface from a first point (e.g., the point 42) to a second point (e.g., the point 44).

Figure 7:
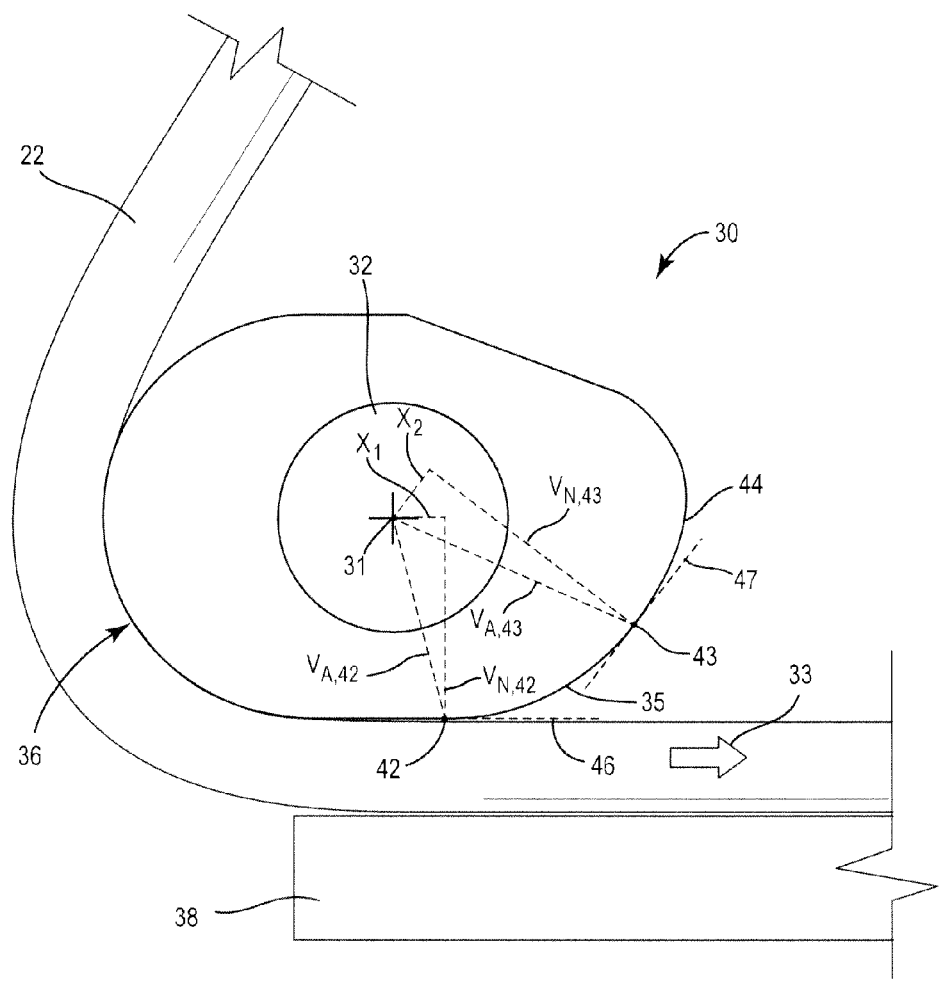
FIG. 7 is a side view of an exemplary embodiment of a cam for use with a pretensioner and having a locking surface configured as an Archimedean spiral.

FIG. 7 illustrates an exemplary embodiment of a cam 30 for use with a pretensioner, such as the pretensioner 18. At least a portion of a periphery (e.g., profile) of the cam 30 includes a locking surface 35 having an Archimedean spiral shape. As shown, the locking surface 35 shaped as an Archimedean spiral extends from point 42 to point 44. However, it is noted that the locking surface 35 could extend farther or shorter around the periphery of the cam 30 relative to points 42 and 44. Also shown, line 46 depicts a tangent line at point 42 on the Archimedean spiral profile, while the line $V_{N,42}$ depicts a line through point 42 that is normal to the tangent line 46. The line $V_{A,42}$ depicts a line that extends through both the point 42 and the pivot axis 31. $X_1$ signifies the moment arm (e.g., length) of the compression force that the cam 30 exerts on the connecting member (e.g., the cable 22) when the cam 30 contacts the connecting member at point 42 (i.e., the line of contact of the locking surface 35 of the cam 30 with the cable 22 is at point 42 along the periphery). The line $X_1$ is perpendicular with the line $V_{N,42}$ and passes through the pivot axis 31. The magnitude of $X_1$ is measured from the pivot axis 31 to the point of intersection with the line $V_{N,42}$. Thus, the magnitude of $X_1$ corresponds to the moment arm length of the compression force on the cable at point 42.

One advantage of a cam having a locking surface with an Archimedean spiral shape over a cam having an eccentric (i.e., pivot axis not coincident with the center), constant radius locking surface is the cam with the Archimedean spiral has an increasing moment arm length when moving along the profile having the Archimedean spiral (e.g., from point 42 to point 44 for the cam 30 in FIG. 7), while the eccentric, constant radius cam has a decreasing moment arm length. This means, as the cam (having the Archimedean spiral locking surface) rotates farther into the locking surface, the cam exerts a higher locking force on the connecting member. In other words, the locking force increases with more rotation of the cam in the locking direction. Illustrating this advantage, an intermediate point 43 (i.e., a point located on the Archimedean spiral profile between points 42 and 44) is provided in FIG. 7. The line 47 depicts a tangent line at point 43 on the Archimedean spiral profile, while the line $V_{N,43}$ depicts a line through point 43 that is normal to the tangent line 47. The line $V_{A,43}$ depicts a line that extends through both the point 43 and the pivot axis 31. $X_2$ signifies the moment arm (e.g., length) of the compression force that the cam 30 exerts on the connecting member (e.g., the cable 22) when the cam 30 contacts the connecting member at point 43 (i.e., the line of contact of the locking surface 35 of the cam 30 with the cable 22 is at point 43 along the periphery). The line $X_2$ is perpendicular with the line $V_{N,43}$ and passes through the pivot axis 31. The magnitude of $X_2$ is measured from the pivot axis 31 to the point of intersection with the line $V_{N,43}$. Thus, the magnitude of $X_2$ corresponds to the moment arm length of the compression force on the cable at point 43. The length $X_2$ is greater than the length $X_1$, which shows that the moment arm length of the cam 30 increases when moving along the Archimedean spiral profile from point 42 to point 44.

According to a non-limiting example, the moment arm length of the compression force of the cam 30 is between 3.00 mm and 4.00 mm. According to another non-limiting example, the moment arm length of the compression force of the cam 30 is between 3.29 mm and 3.88 mm.

The cam 30 having an Archimedean spiral shape has a pitch, as an Archimedean spiral follows the general equation $r=a+b\theta$, where the pitch is denoted by the variable b and the origin of the spiral (i.e., where the spiral begins) is denoted by the variable a. According to an exemplary embodiment, the origin of the spiral (i.e., variable a) is coincident with the pivot axis 31. According to an exemplary embodiment, the spiral has a pitch (i.e., variable b) that ranges from 20 mm to 30 mm. According to a preferred embodiment, the spiral has a pitch of about 25 mm. The pitch controls how far the spiral (e.g., the locking surface) is from the origin (e.g., the pivot axis). The aforementioned range is advantageous, because a pitch of less than 20 mm may require too much cam rotation before locking the connecting member (e.g., cable 22), while a pitch that is greater than 30 mm may provide too little clamp force leading to slippage of the connecting member when the cam is trying to lock the connecting member in place.

The cam 30 may be configured to engage and begin clamping the cable 22 at the first point 42 or any point between the first point 42 and the second point 44. Additional rotation of the cam 30 after engagement (e.g., initial clamping) into further engagement (e.g., in the clockwise direction, as shown in FIG. 5), is configured to dig the cam 30 deeper into the cable 22. The cam 30 may be configured to provide an increasing clamping force as the cam 30 further rotates moving the engagement/contact point between the cable 22 and the cam 30 from the first point 42 to the second point 44. The increasing clamping force may be configured to counter an increasing loading of the seat belt 13 by an occupant (and loading in the cable 22). By having a relatively smooth locking surface (e.g., not including any teeth or other protrusions/indentations) having, for example, an Archimedean spiral shape, the locking surface 35 of the cam 30 may reduce slipping of the cable 22 relative to the cam 30 to advantageously provide a more consistent restraint performance. For example, the area of contact between the cam 30 and the cable 22 may be increased. Also, for example, the locking ratio of the cam 30 may be increased as the cam rotates further into engagement with the cable 22. According to other embodiments, the locking surface 35 may have a constant radius that is eccentric relative to the pivot axis 31. However, a locking surface having an Archimedean spiral has the above noted advantages over an eccentric, constant radius locking surface.

The cam 30 may be at least partially formed from a material that is configured to deform (e.g., plastic deformation) when a threshold load on the locking surface 35 of the cam 30 is reached. The cam 30 may be configured to reach the threshold load at any engagement point (with the cable 22) from the first point 42 to the second point 44. The entire cam 30 may be made from a material that is configured to deform at the threshold load, or only a portion of the cam 30 (e.g., an end portion having the locking surface 35) may be formed from (or include) a material that is configured to deform when the cam 30 engages the cable 22 and applies a threshold clamping force to the cable 22. According to an exemplary embodiment, the portion of the cam 30 having the locking surface 35 is formed from a material having a hardness of between HRB 45 and HRB 95, where the term "HRB" denotes a hardness using the Rockwell "B" scale. In other embodiments, the entire cam 30 may be formed from a material having a hardness of between HRB 45 and HRB 95. According to another exemplary embodiment, the cam (or the portion having the locking surface) is formed from a material having a hardness that is 10 HRB points lower than a hardness of the connecting member (e.g., the cable 22). According to an exemplary embodiment, the hardness of the cable 22 is about HRB 108 (e.g., a hardness in the range of HRB 105-111). For a pretensioner using such a cable, the cam should have a hardness that is no greater than HRB 95 to provide the deformation.

After the threshold load is reached, the cam 30 plastically deforms around the cable 22 thereby increasing the surface area of the locking surface 35 contacting the cable 22, which provides a greater mechanical linkage and may provide a greater friction force between the cam 30 and the cable 22. The greater mechanical linkage and greater friction force reduces the likelihood that the cable 22 will slip and increases the reliability of the restraint provided by the pretensioner 18 during and/or following pretensioning.

Figure 6:
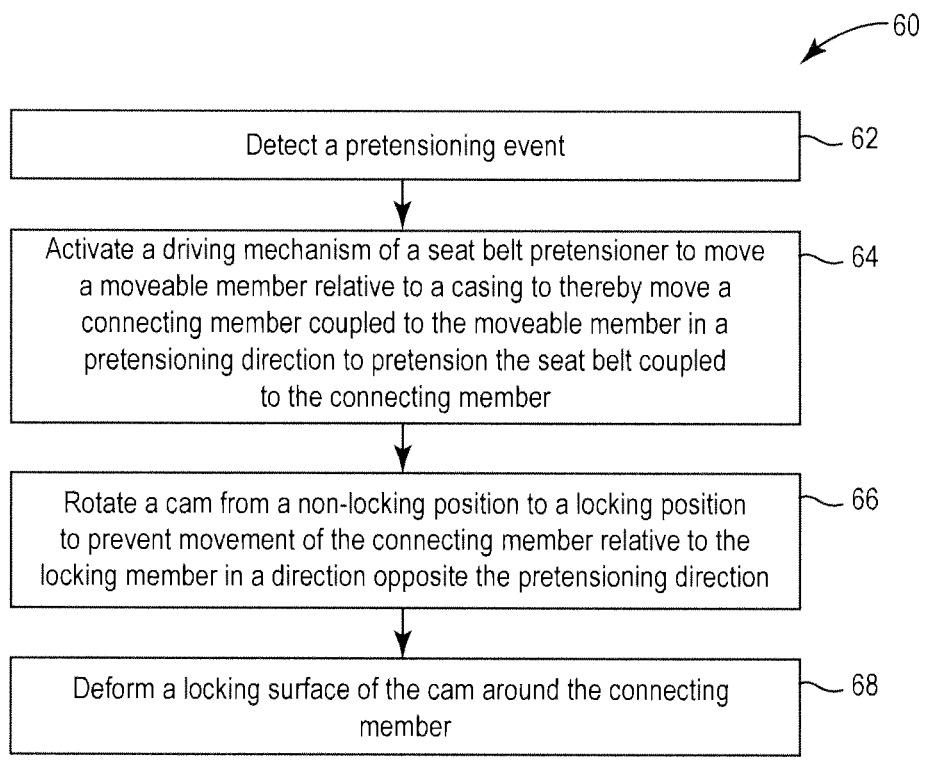
FIG. 6 is a flowchart of a method of pretensioning a seat belt of a seat belt system, according to an exemplary embodiment.

FIG. 6 illustrates an exemplary method 60 of pretensioning a seat belt of a seat belt system configured to restrain an occupant of a vehicle. The method 60 includes detecting a pretensioning event of the vehicle (step 62). Detecting a pretensioning event of the vehicle may include receiving one or more signals from one or more vehicle sensors/systems and analyzing the one or more signals to determine when to activate a pretensioning device.

The method 60 further includes activating a driving mechanism of a seat belt pretensioner to move a movable member relative to a casing to thereby move a connecting member coupled to the movable member in a pretensioning direction to pretension the seat belt coupled to the connecting member (step 64). The driving mechanism may be activated with an activation signal from a controller after the controller has received sensor data (e.g., via the one or more signals) indicating a pretensioning event. As described above, the moveable member may be a cable coupled between a portion of the seat belt and a piston that is moved in the pretensioning direction by gas generated by a pyrotechnic gas generator.

The method 60 further includes rotating a cam from a non-locking position to a locking position (step 66). In the non-locking position, the connecting member is able to freely move between the cam and a locking member of the casing (e.g., a counter plate). In the locking position, a contact surface (e.g., a locking surface, locking contact surface, etc.) of the cam clamps the connecting member between the cam and the locking member to prevent further movement of the connecting member relative to the locking member in a direction opposite the pretensioning direction, after a length of travel of movable member relative to the casing. In other words, the locking surface of the cam is configured to prevent movement of the connecting member in a seat belt loosening direction. The cam may include (or consist of) a material having a hardness of 45 to 95 HRB.

The method 60 may further include deforming the locking surface of the cam around the connecting member (step 68). For example, the locking surface may deform around a connecting member having a circular or semi-circular cross-sectional shape (e.g., cables) to increase the surface area of the cam locking the connecting member. The locking surface of the cam may be configured to deform upon reaching a threshold force (e.g., load) to increase the surface area of contact between the cam and the connecting member. The threshold force may result from the force(s) clamping the connecting member between the cam and the locking member.

It is noted that the pretensioners disclosed in this application include a cam and a connecting member, which are configured to deform when in a locking mode of operation, such as following pretensioning of the connecting member. In other words, the connecting member (e.g., cable) is deforming (e.g., plastic deformation) as the connecting member is loaded (by the cam) and compressed, and the cam is deforming (e.g., plastic deformation) while loading the connecting member to maintain or increase the contact area between the cam and connecting member. This deformation of the cam when clamping the connecting member may increase the mechanical advantage and/or greatly increase the friction (e.g., between the cam and the connecting member) to prevent slippage of the connecting member and maintain the locked position of the connecting member relative to the cam.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., movable, removable, or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat belt-to-pretensioner connector assemblies as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method of steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A seat belt pretensioner for use with a seat belt assembly having an anchor, a buckle and a webbing, the pretensioner comprising:
   a casing defining a pivot axis and including a locking member;
   a driving mechanism supported by the casing, the driving mechanism including a movable member that is configured to move relative to the casing during pretensioning;
   a flexible connecting member having a first end coupled to the movable member and a second end configured to be coupled to one of the anchor, the buckle and the webbing; and
   a cam including a locking surface having a cross-sectional shape that is an Archimedean spiral, wherein the cam is rotatable about the pivot axis relative to the casing between a non-locking position, in which the connecting member is able to freely move between the cam and the locking member of the casing, and a locking position, in which the locking surface clamps the connecting member to the locking member to prevent any further movement of the connecting member relative to the locking member.

2. The seat belt pretensioner of claim 1, wherein the locking surface of the cam is smooth.

3. The seat belt pretensioner of claim 2, wherein the smooth locking surface is devoid of any teeth and has an origin that is coincident to the pivot axis.

4. The seat belt pretensioner of claim 1, wherein a pitch of the locking surface ranges from 20 mm to 30 mm.

5. The seat belt pretensioner of claim 4, wherein the locking surface has a moment arm length of a compression force of the cam that ranges from 3.29 mm to 3.88 mm.

6. The seat belt pretensioner of claim 4, wherein the cam includes a material having a hardness of HRB 45 to HRB 95.

7. The seat belt pretensioner of claim 5, wherein the cam is configured to deform along the locking surface when the cam is in the locking position and subjected to a threshold load thereby increasing the surface area of the cam contacting the connecting member.

8. The seat belt pretensioner of claim 1, wherein the cam includes a material having a hardness of HRB 45 to HRB 95.

9. A seat belt system for a vehicle, comprising:
a seat belt configured to restrain an occupant of the vehicle;
an anchor coupled to a first portion of the seat belt;
a tongue member adjustably coupled to a second portion of the seat belt;
a buckle mechanism configured to selectively receive the tongue member; and
a pretensioner assembly comprising:
a casing including a locking member;
a driving mechanism supported by the casing and including a movable member that is movable relative to the casing;
a flexible connecting member having a first portion coupled to the movable member and a second portion coupled to one of the anchor and the buckle mechanism; and
a cam including a smooth contact surface, wherein the cam is supported by the casing and is rotatable about a pivot axis relative to the casing between a non-locking position, in which the connecting member is able to freely move between the cam and the locking member of the casing, and a locking position, in which the contact surface clamps the connecting member between the cam and the locking member to prevent any further movement of the connecting member relative to the locking member.

10. The seat belt system of claim 9, wherein the smooth contact surface is devoid of any projections.

11. The seat belt system of claim 10, wherein the smooth contact surface is also devoid of any indentations.

12. The seat belt system of claim 9, wherein the contact surface is concentric relative to the pivot axis and has a cross-sectional shape that is an Archimedean spiral.

13. The seat belt system of claim 12, wherein a pitch of the contact surface ranges from 20 mm to 30 mm.

14. The seat belt system of claim 9, wherein the cam includes a material having a hardness of HRB 45 to HRB 95.

15. The seat belt system of claim 14, wherein the cam is configured to deform into a shape in which the surface area of the cam contacting the connecting member increases due to the deformation of the cam along the contact surface when the cam is in the locking position and subjected to a threshold load.

16. A method of pretensioning a seat belt of a seat belt system configured to restrain an occupant of a vehicle, the method comprising the steps of:
detecting a pretensioning event of the vehicle;
activating a driving mechanism of a seat belt pretensioner to move a movable member relative to a casing to thereby move a connecting member coupled to the movable member in a pretensioning direction to pretension the seat belt coupled to the connecting member;
rotating a cam from a non-locking position, in which the connecting member is able to freely move between the cam and a locking member of the casing, to a locking position, in which a contact surface of the cam clamps the connecting member between the cam and the locking member to prevent movement of the connecting member relative to the locking member in a direction opposite the pretensioning direction, after a length of travel of movable member relative to the casing, wherein the cam includes a material having a hardness of 45 to 95 HRB and
deforming the contact surface of the cam when the cam is in the locking position and subjected to a threshold load to thereby increase the surface area of the cam contacting the connecting member.

17. The method of claim 16, wherein the contact surface has a cross-sectional shape that is an Archimedean spiral, and wherein the contact surface has a moment arm length of a compression force of the cam that ranges from 3.29 mm to 3.88 mm.

18. The method of claim 16, wherein the contact surface of the cam has a smooth profile that is devoid of any projections and indentations prior to deformation.

19. The method of claim 16, the seat belt is indirectly coupled to the connecting member through one of an anchor and a buckle mechanism.

* * * * *